US012809447B2

(12) United States Patent
Gan et al.

(10) Patent No.: US 12,809,447 B2
(45) Date of Patent: Nov. 24, 2026

(54) DYNAMIC POWER-AWARE WORKLOAD SCHEDULER

(71) Applicant: Google LLC, Mountain View, CA (US)

(72) Inventors: Houle Gan, Santa Clara, CA (US); Madhusudan K. Iyengar, Foster City, CA (US); Michael David Hutton, Mountain View, CA (US)

(73) Assignee: Google LLC, Mountain View, CA (US)

( * ) Notice: Subject to any disclaimer, the term of this patent is extended or adjusted under 35 U.S.C. 154(b) by 55 days.

(21) Appl. No.: 18/371,012

(22) Filed: Sep. 21, 2023

(65) Prior Publication Data

US 2025/0103128 A1 Mar. 27, 2025

(51) Int. Cl.
*G06F 1/329* (2019.01)

(52) U.S. Cl.
CPC .................................... *G06F 1/329* (2013.01)

(58) Field of Classification Search
CPC ....................................................... G06F 1/329
See application file for complete search history.

(56) References Cited

U.S. PATENT DOCUMENTS 10,101,786 B2 * 10/2018 Eastep .................... G06F 1/189
10,268,262 B2 * 4/2019 Khatri ................... G06F 1/3234
11,397,457 B2 * 7/2022 Jain ....................... G06F 1/3296
11,644,887 B2 * 5/2023 Song ................... G06F 11/3062 713/320
12,155,210 B2 * 11/2024 Zeighami ................ H02J 3/144
2011/0178652 A1 * 7/2011 Carter ..................... G06F 1/329 700/296
2012/0216205 A1 8/2012 Bell, Jr. et al.
2013/0311812 A1 * 11/2013 Bose ..................... G06F 9/4893 713/340
2014/0075222 A1 * 3/2014 Jackson .................. G06F 1/329 713/320
2015/0177811 A1 * 6/2015 Bose ..................... G06F 1/3287 713/320
2016/0054779 A1 * 2/2016 Bodas ..................... H04L 43/08 700/291
2016/0054780 A1 * 2/2016 Bodas ................... G06F 9/5094 713/320

(Continued)

OTHER PUBLICATIONS

1 Extended European Search Report for European Patent Application No. 24201802.6 dated Jan. 3, 2025. 8 pages.

*Primary Examiner* — Jaweed A Abbaszadeh
*Assistant Examiner* — Cheri L Harrington
(74) *Attorney, Agent, or Firm* — Lerner David LLP

(57) ABSTRACT

Systems and methods for managing power allocation by connecting a power capping control loop to a workload scheduler. The work scheduler may receive a workload for execution by one or more of a plurality of machines, assign the workload to one or more designated machines of the plurality of machines, determine a respective power quota for each of the one or more designated machines, instruct a programmable power capping control loop to control operation of each of the one or more designated machines according to its respective power quota; and update, after assigning the workload to the one or more designated machines, a record indicating (i) available power of a domain including the plurality of machines and/or (ii) available machines within the domain.

20 Claims, 4 Drawing Sheets

(56) References Cited

U.S. PATENT DOCUMENTS

| | | | | |
|---|---|---|---|---|
| 2016/0179162 | A1* | 6/2016 | Eastep | G06F 9/5094<br>713/320 |
| 2021/0373639 | A1* | 12/2021 | Kontorinis | G06F 1/329 |
| 2021/0405728 | A1* | 12/2021 | Jain | H05K 7/1487 |
| 2022/0057823 | A1* | 2/2022 | Armistead, III | G06F 1/3296 |
| 2022/0291734 | A1* | 9/2022 | Wilde | G06F 1/3203 |
| 2023/0126109 | A1* | 4/2023 | Mukherjee | G06F 1/3234<br>713/320 |
| 2024/0339834 | A1* | 10/2024 | Zeighami | G06F 1/206 |

* cited by examiner

DYNAMIC POWER-AWARE WORKLOAD SCHEDULER

BACKGROUND

The thermal design power (TDP) of an electronic system corresponds to the maximum power consumption for which its upstream power supply unit (PSU) needs to provision. In practice, a PSU with a capacity lower than 100% of the TDP combined from all systems connected to it is typically used and may be required, which is commonly named electrical oversubscription. However, electrical oversubscription can lead to insufficient power capacity when all connected systems are simultaneously running at or close to the full TDP level.

One way to enable electrical oversubscription in the electronic system while protecting against insufficient power capacity scenarios is to implement a power capping program. A typical power capping program monitors the total power consumption of the system and issues throttling commands to every machine in the monitored system when the total power consumption reaches a predefined limit. However, throttling affects all machines at the monitored system, which comes at a cost to performance.

Another way to enable electrical oversubscription is to limit how much power each machine can use. To do so, the power input at the machine may be monitored and feedback may be provided to the machine to adjust power consumption based on the monitored power input, such as by adjusting clock frequency, adjusting an instruction rate, skipping a number of clock cycles, and so on. However, this approach still caps machines at respective power levels regardless of the number of workloads being run on each machine, which is inefficient. Furthermore, in both the power capping and power limit specifying approaches, stopped or slowed down workloads have no way of determining whether the cause of the stoppage is from electrical oversubscription or some other failure, making it difficult to accurately monitor the workloads' performance.

SUMMARY

The present disclosure provides an improved technique for managing power allocation by connecting a power capping control loop to a workload scheduler.

One aspect of the disclosure is directed to a system including one or more processors; and memory having programmed thereon instructions for causing the one or more processors to: receive a workload for execution by one or more of a plurality of machines; assign the workload to one or more designated machines of the plurality of machines; determine a respective power quota for each of the one or more designated machines; instruct a programmable power capping control loop to control operation of each of the one or more designated machines according to its respective power quota; and update, after assigning the workload to the one or more designated machines, a record indicating (i) available power of a domain including the plurality of machines and/or (ii) available machines within the domain.

In some examples, the system may further include the programmable power capping control loop.

In some examples, the programmable power capping control loop may be configured to monitor power inputs at the one or more designated machines and adjust power consumption at each of the one or more machines based on the monitored power inputs.

In some examples, the instructions may further cause the one or more processors to: in response to receiving the workload, access a power characterization data source indicating predicted power related properties of the workload; determine an overall power quota for the workload based on the predicted power-related properties of the workload; and determine the respective power quota for each of the one or more designated machines based on the overall power quota.

In some examples, the power related properties may include one or more of an average power consumption, a maximum current change slew rate, an average utilization ratio, or a maximum utilization ratio.

In some examples, in response to initiation of the workload, the instructions may cause the one or more processors to increase the respective power quota of each of the machines and update the record accordingly, and in response to completion of the workload, the instructions may cause the one or more processors to decrease the respective power quota of each of the machines and update the record accordingly.

In some examples, the instructions may further cause the one or more processors to: in response to receiving the workload, adjust the overall power quota of a previously received workload; and instruct the programmable power capping control loop to control operation of each of one or more previously designated machines to which the previous workload is assigned to adjust their respective power quotas to meet the adjusted overall power quota of the previously received workload.

In some examples, adjustment of the overall power quota of the previously received workload may be based on respective priority levels of the workload and the previously received workload.

In some examples, the instructions may further cause the one or more processors to transmit an indication of the adjustment of the overall power quota to the previously received workload.

Another aspect of the disclosure is directed to a data center including the system of any of the embodiments described herein, the programmable power capping control loop, and the plurality of machines.

In some examples, each machine of the plurality of machines may be a tray including a plurality of processor chips.

A further aspect of the disclosure is directed to a method including: receiving, by one or more processors, a workload for execution by one or more of a plurality of machines; assigning, by the one or more processors, the workload to one or more designated machines of the plurality of machines; determining, by the one or more processors, a respective power quota for each of the one or more designated machines; instructing, by the one or more processors, a programmable power capping control loop to control operation of each of the one or more designated machines according to its respective power quota; and updating, by the one or more processors, after assigning the workload to the one or more designated machines, a record indicating (i) available power of a domain including the plurality of machines and/or (ii) available machines within the domain.

In some examples, the method may further include controlling, by the programmable power capping control loop, the operation of each of the one or more designated machines according to its respective power quota.

In some examples, controlling the operation of each of the one or more designated machines may involve: monitoring power inputs at the one or more designated machines; and adjusting a thermal design power (TDP) at each of the one or more machines based on the monitored power inputs.

In some examples, the method may further include: in response to receiving the workload, accessing a power characterization data source indicating predicted power related properties of the workload; determining an overall power quota for the workload based on the predicted power-related properties of the workload; and determining the respective power quota for each of the one or more designated machines based on the overall power quota.

In some examples, the power related properties may include one or more of an average power consumption, a maximum current change slew rate, an average utilization ratio, or a maximum utilization ratio.

In some examples, the method may further include: in response to initiation of the workload, increasing, by the one or more processors, the respective power quota of each of the machines and updating the record accordingly; and in response to completion of the workload, decreasing, by the one or more processors, the respective power quota of each of the machines and updating the record accordingly.

In some examples, the method may further include in response to receiving the workload, adjusting the overall power quota of a previously received workload; and instructing the programmable power capping control loop to control operation of each of one or more previously designated machines to which the previous workload is assigned to adjust their respective power quotas to meet the adjusted overall power quota of the previously received workload.

In some examples, the method may further include adjustment of the overall power quota of the previously received workload may be based on respective priority levels of the workload and the previously received workload.

In some examples, the method may further include transmitting, by the one or more processors, an indication of the adjustment of the overall power quota to the previously received workload.

DETAILED DESCRIPTION

Overview

Figure 1:
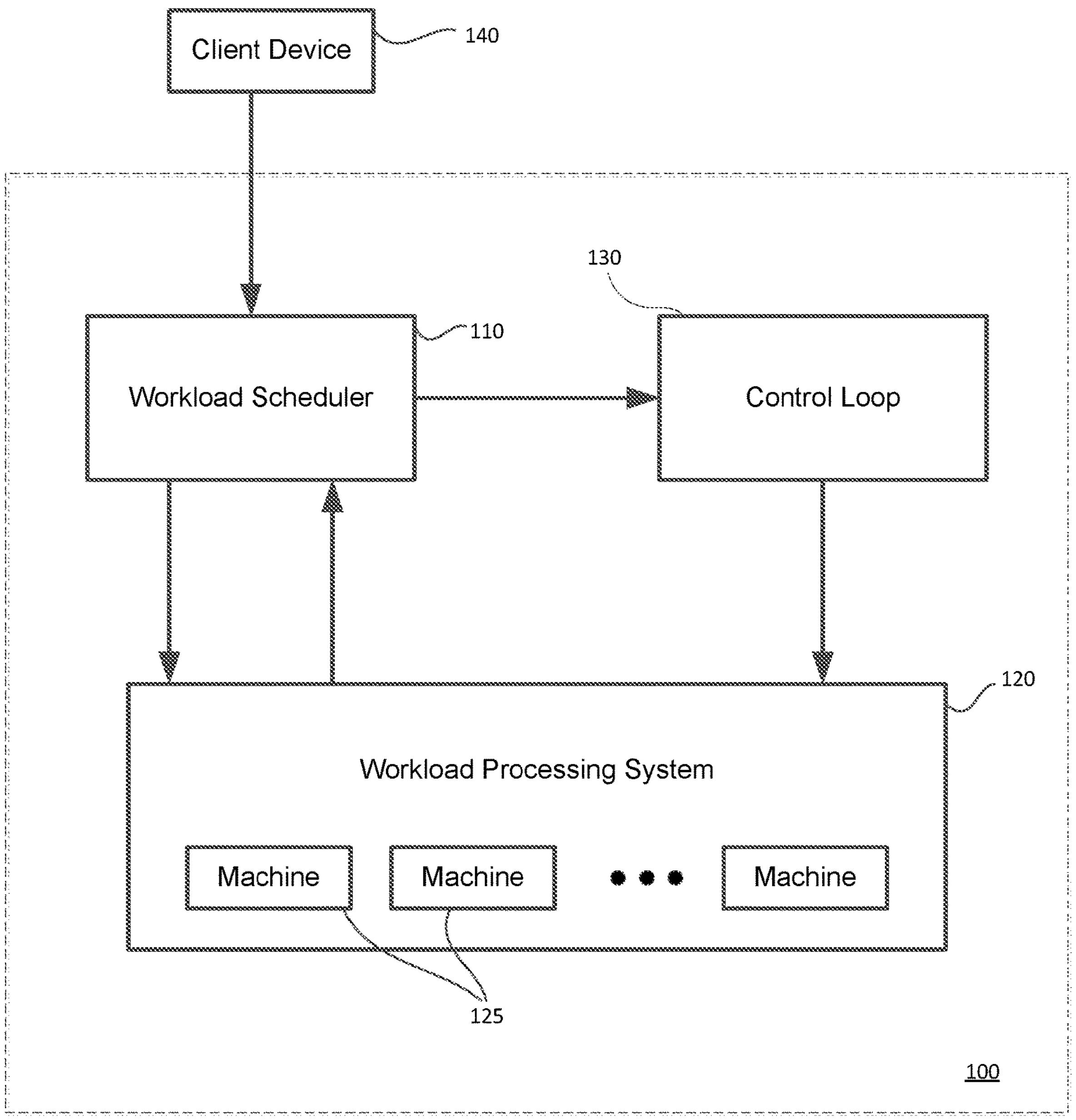
FIG. 1 is a block diagram of an example system in accordance with an aspect of the present disclosure.

The workload scheduler maintains up-to-date information about available power and available machines in the monitored domain that it manages. Then, when the workload receives workloads to be scheduled on one or more of the machines of the domain, the workload scheduler can assign each workload to one or more machines of the monitored domain, assign an amount of power to the workload, and update the information about available power and available machines to reflect the new assignments. The power assignments may further be communicated from the workload scheduler to the power capping control loop for enforcement. For example, power capping may be handled by a programmable thermal design power interface that is capable of separately managing power limits for multiple machines.

In operation, the power capping control loop may dynamically adjust caps for each of the machines, or for clusters of the machines based on the workloads running at each machine. For example, when a workload begins at one or more machines, the workload scheduler may instruct the power capping control loop to increase the power cap for those machines. Later, when the workload finishes, the power cap can be returned to its previous level, such as a minimum level.

In order to determine the power requirements of any given workload, the workload scheduler may be capable of accessing a data source containing power characteristics of different types of workloads. The power characteristics may be based on existing workloads of a given type, and may include such properties as average power consumption, maximum current change slew rate, average utilization ratio, maximum utilization ratio, the job's priority and latency requirement, and so on. In some examples, power characteristics may also be differentiated based on the type of hardware the workload is run on, such that the same workload type may have different characteristics for different hardware platform types.

The use of a workload scheduler to facilitate electrical oversubscription without exceeding the overall power capacity may yield several benefits over conventional power capping programs. For example, the use of a workload scheduler as described herein avoids the need for a system-wide power capping mechanism, meaning that system-wide long-latency over-throttling can be avoided entirely. This is because the power capping control loop can enforce power limits on a machine-to-machine basis. For further example, it can be known whether the performance of a particular workload is affected by power capping since the allocated power quota of each workload is separately tracked, which in turn can help to identify the cause of failure or performance impact for any given workload. Overall, the result of dynamic power quota allocation among workloads allows for greater flexibility of power allocation, especially at large scales such as data centers or other fleet-level computing systems. This in turn can yield improved performance for workloads, as well as reduce the required power for optimized workload performance.

Example Systems

FIG. 1 is a block diagram illustrating an example system 100 including a workload scheduler 110 for scheduling workloads to be executed by one or more machines 125 in a workload processing system 120, and a control loop 130 for regulating power distributed to the one or more machines 125 of the workload processing system 120.

The workload processing system 120 may be a large-scale computing center, such as a data center containing several racks of processing and storage hardware, and may include control systems for controlling operation of the processing and storage hardware. Each rack of the data center may itself include several trays, each tray including a number of chips. Thus, the processing and storage hardware of the data center may be characterized in terms of several different levels of granularity, such as an entire building, an entire floor, a complete rack, an entire tray, or individual chips. A particular portion of the workload processing system 120 may have a given limit of available power due to power delivery constraints. In such a case, such a portion of the workload processing system may be considered its own power domain, whereby the overall amount of power provisioned to the machines 125 included in that portion of the workload processing system 120 may be regulated independently of other portions of the workload processing system 120. The size or granularity of the power domain for which the overall amount of power is regulated may vary from one system to another, and may encompass any level of granularity, such as a bus duct within a data center, or a power cluster within the data center.

The machines 125 included in the workload processing system 120 may be processing and storage hardware, such as any one or combination of various types of processing units and integrated circuits, including but not limited to CPUs, graphics processing units (GPUs), tensor processing units (TPUs), field programmable gate arrays (FPGAs), application-specific integrated circuits (ASICs), and so on. Storage hardware of the workload processing system 120 may include any one or combination of types of memory, such as read-only memory, random access memory, removable storage media, cache, registers, or the like. For instance, the storage hardware may include dynamic random access memory (DRAM) modules, which may or may not include one or more dual in-line memory modules (DIMMs), high-bandwidth memory (HBM) modules, or both.

The system 100 may further include one or more power sources (not shown) for provisioning power to the various processing and storage hardware contained therein. The amount of power required for each individual hardware unit may vary over time depending on whether the unit is processing a workload or idle, and in the case when the hardware unit is processing a workload, the amount of required power may further vary based on several factors, such as the type of hardware being utilized and the type of workload being processed. As such, each individual hardware unit may be rated to receive a maximum amount of power such that the sum of every hardware unit's maximum amount of power in the workload processing system 120 may exceed the total available power from the power sources. Therefore, to avoid the power demands of the workload processing system 120 exceeding the total available power from the power sources, power to the individual hardware units may be dynamically capped or limited to meet but not exceed the power demands of the workloads being executed on those individual hardware units.

In the example of FIG. 1, dynamic capping or limiting of the available power is handled by the control loop 130. In some examples, the control loop may be a programmable thermal design power (TDP) control loop configured to adjust the TDP of a corresponding machine in order to enforce a power limit or cap on the machine.

The control loop may be programmed to check the power usage of the hardware units as the workloads are being executed, and may adjust one or more aspects of the workload execution in order to enforce the power cap requirement. For instance, if it is determined that the hardware units operating a specific workload are using more power than was dynamically allocated to those hardware units for executing the workload, then action can be taken to adjust processing at the hardware units to meet the power cap. This may involve any one or combination of adjusting a clock frequency of the hardware units, adjusting an instruction rate of the hardware units, skipping a number of clock cycles, and so on.

Figure 2:
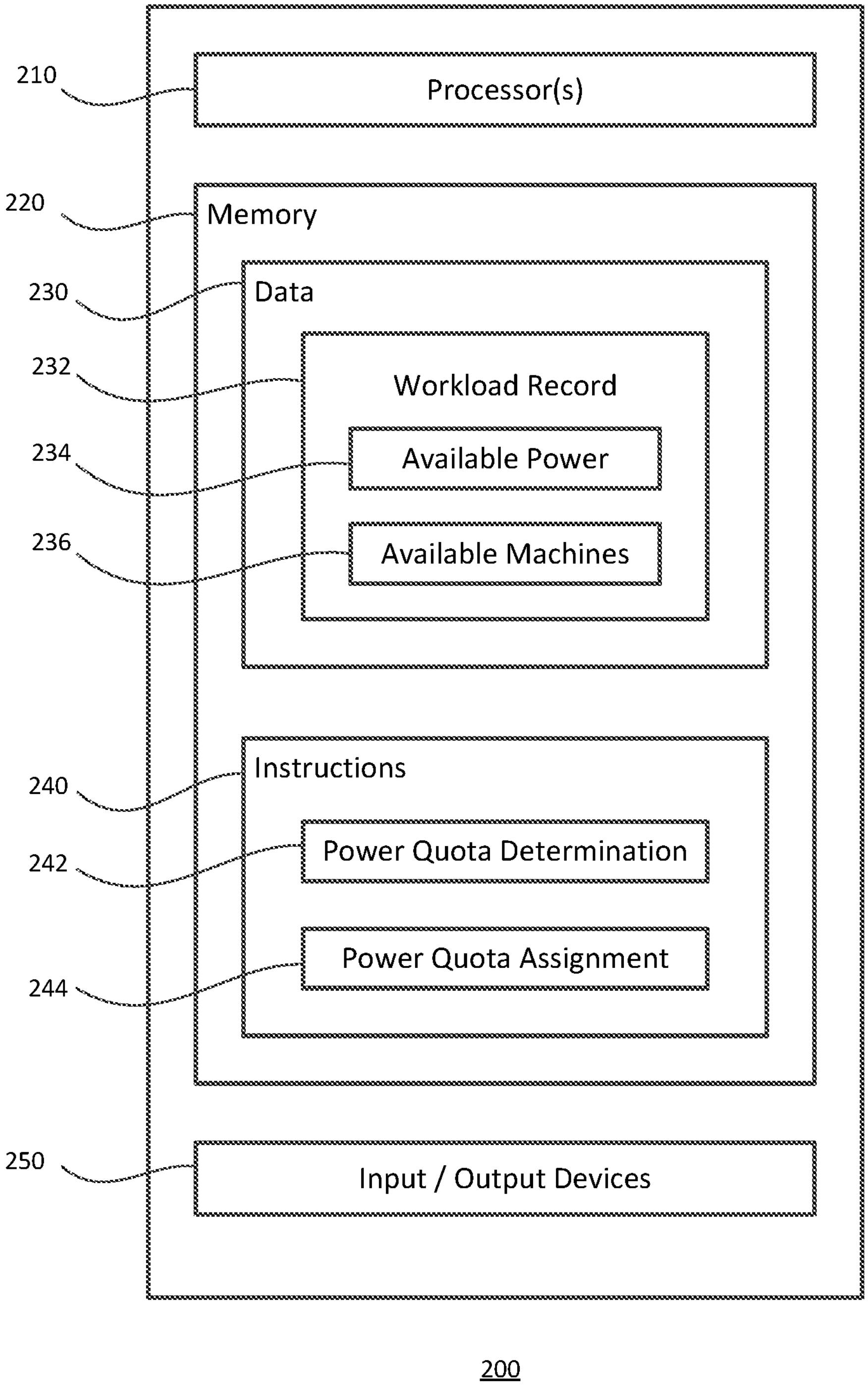
FIG. 2 is a block diagram of an example workload scheduler in accordance with an aspect of the present disclosure.

An example workload scheduler 110 is shown in greater detail in FIG. 2. In the example of FIG. 2, a workload scheduler 200 includes one or more processors 210, memory 220, and other components typically present in general purpose computers. The memory 220 can store information accessible by the processor 210, including data 230 that can be retrieved, manipulated or stored by the processor 210, and instructions 240 that can be executed by the processor 210. The processor 210 can be a well-known processor or other lesser-known types of processors. Alternatively, the processor 210 can be a dedicated controller such as an ASIC. The memory 220 may be a type of non-transitory computer readable medium capable of storing information accessible by the processor 210, such as a hard-drive, solid state drive, tape drive, optical storage, memory card, ROM, RAM, DVD, CD-ROM, write-capable, and read-only memories.

The data 230 can be retrieved, stored or modified by the processor 210 in accordance with the instructions 240. For instance, although the system and method is not limited by a particular data structure, the data 230 can be stored in computer registers, in a data store as a structure having a plurality of different fields and records, or documents, or buffers. The data 230 can also be formatted in a computer-readable format such as, but not limited to, binary values, ASCII or Unicode. Moreover, the data 230 can include information sufficient to identify relevant information, such as numbers, descriptive text, proprietary codes, pointers, references to data stored in other memories, including other network locations, or information that is used by a function to calculate relevant data.

The instructions 240 can be a set of instructions executed directly, such as machine code, or indirectly, such as scripts, by the processor 210. In this regard, the terms "instructions," "steps" and "programs" can be used interchangeably herein. The instructions 240 can be stored in object code format for direct processing by the processor 210, or other types of computer language including scripts or collections of independent source code modules that are interpreted on demand or compiled in advance.

Although FIG. 2 functionally illustrates the processor 210 and memory 220 as being within the same block, the processor 210 and memory 220 may actually include multiple processors and memories that may or may not be stored within the same physical housing. For example, some of the data 230 and instructions 240 can be stored on a removable CD-ROM and others within a read-only computer chip. Some or all of the instructions and data can be stored in a location physically remote from, yet still accessible by, the processor 210. Similarly, the processor 210 can actually include a collection of processors, which may or may not operate in parallel.

The workload scheduler 200 may include a number of other devices in addition to the processor and storage devices, such as communication devices 250 to enable input and output between the computing devices, such as cabling, routers, etc. The communication devices 250 may facilitate communication between the workload scheduler 200 and a client device or other remote device in communication with the system, and may be capable of transmitting data to and from other computers such as modems (e.g., dial-up, cable or fiber optic) and wireless interfaces. For example, the workload scheduler 200 may receive communications via a network connection, such as through the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing.

In the example of FIG. 2, the data 230 is shown as including a workload record 232, which may contain information about the workloads being executed at the system at a given time. The workload record 232 may itself include an indication of the available power 234 for provisioning to incoming workloads. Available power may be considered the difference between the total available power that the system can receive from its power sources and the total provisioned power at a given time. Managing the available power can indicate to the workload manager whether there is enough available power for an incoming workload to be executed by one or more machines at the system. The workload record 232 may also include an indication of available machines 236 for executing incoming workloads. The available machines may include any one or group of machines that have remaining capacity for handling the incoming workload, either in terms of processing capacity, memory space, or both.

In some examples, the workload record may include further details about individual workloads, such as a record of each workload assigned to the system and the particular machines to which the workload is assigned. In such an example, the workload record may further include other details on a per-workload basis, such as the amount of power allotted to the assigned machines, a priority level of the workload, and so on.

Also, in the example of FIG. 2, the instructions 240 are shown as including a power quota determination process 242 for determining an amount of power to provision to the one or group of machines for each respective incoming workload request, and a power quota assignment process 244 for assigning the workload to one or a group of machines for execution. Assigning the workload may involve both instructing the machines to execute the workload, and instructing the control loop to cap the power allowance for the assigned machines to a predetermined amount, such as the amount determined in the quota determination process 242. More specifically, for one or a group of machines that are assigned to execute multiple workloads at a given time, the total power allowance for the assigned machines may be a sum of the respective predetermined amounts of power for each of the workloads. These processes and others are described in greater detail in connection with the flow diagram of FIG. 3. It should be understood that the routines described herein are merely examples, and in other examples, certain steps may be added, subtracted, replaced or reordered.

Example Methods

Figure 3:
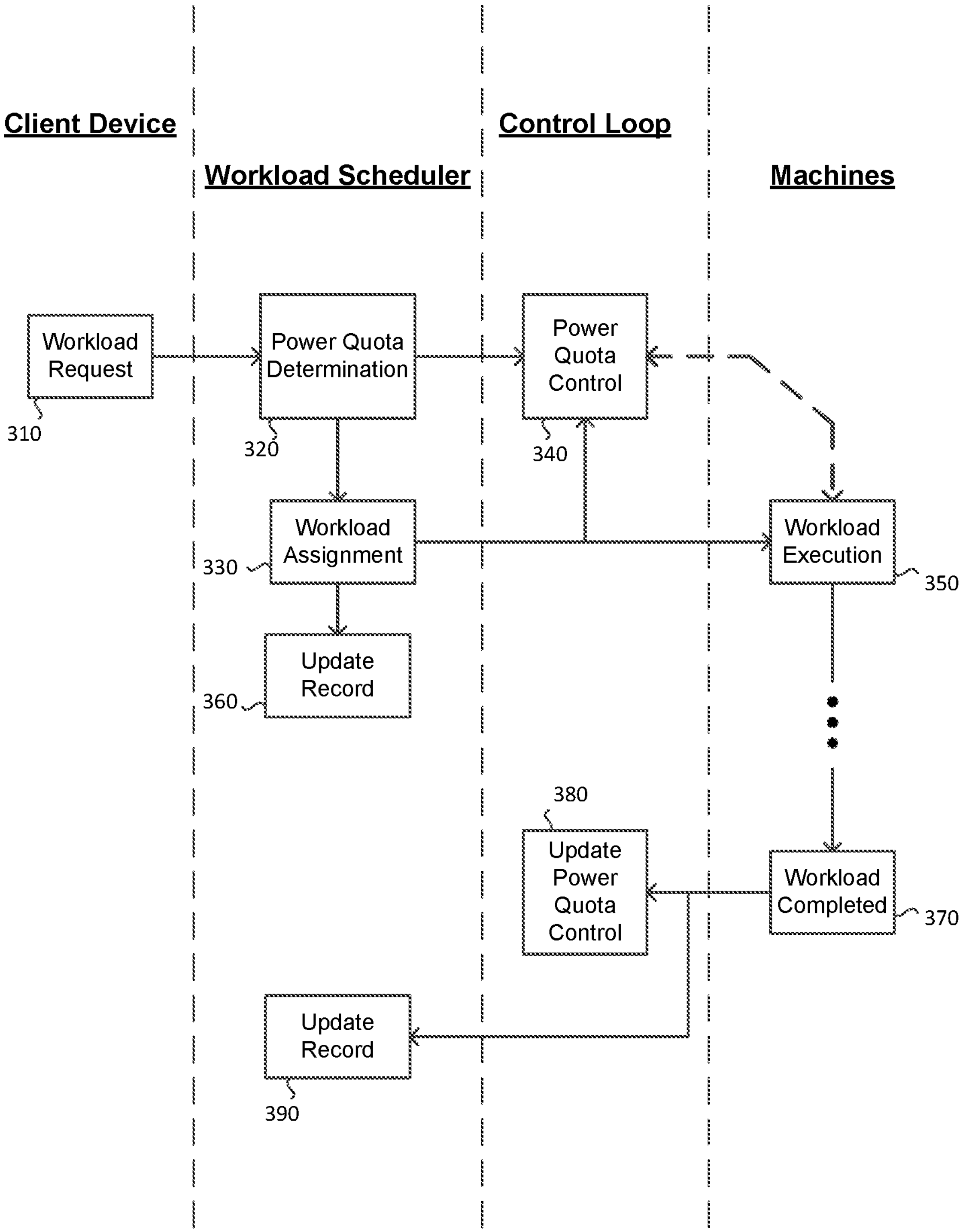
FIG. 3 is a block diagram illustrating an example operational flow in accordance with an aspect of the present disclosure.

FIG. 3 is a flow diagram illustrating an example flow of operations in accordance with the present disclosure. The operations in FIG. 3 facilitate dynamic power allocation and control for a power domain containing multiple machines for execution of workloads.

Operations may begin at block 310 in which a workload request is received at the workload scheduler. The workload request may be transmitted from a client device over a network.

In response to receipt of the workload request, at block 320, the workload scheduler may perform a power quota determination in which an amount of power required to execute the workload indicated by the workload request is determined. The amount of power required may be characterized using data collected from previously executed workloads. For example, if the same or a similar workload has been executed in the system at a previous time and the amount of power required to execute the workload was monitored at that time, then the same or a similar amount of power may be determined to be required for the workload of the currently received workload request.

Power characterization of previous workloads may be based on either one or both of the properties of the hardware used to execute the workload and the workload itself. For example, different types of hardware may have different power requirements for executing the same workload. Therefore, power characterization may involve first selecting a type of hardware, such as a type of processor or type of chip, to be used to execute the workload, and then determining the power demands of the workload on the selected hardware type.

In power characterization, the power demands may be characterized in terms of average power consumption for a given duration of time, such as per 10 microseconds, per 10 milliseconds, per one second, and so on. Additionally or alternatively, the power demand may be characterized in terms of maximum current change slew rate (which can be measured in units of current over time, e.g., amperes per microsecond). Additionally or alternatively, the power demand may be characterized in terms of utilization ratio on the hardware for execution. In this context, the utilization ratio may refer to either one or both of an average utilization ratio or a peak utilization ratio.

In some examples, power demand characterization may be facilitated by a lookup table that contains information about a workload's power characteristics or profile based on either one or both of previous runs of the same or similar workloads, or simulations of the same or similar workloads. In such an example, the characterization may be performed without collecting any current information about workload performance. Additionally or alternatively, the power characteristics or profile may be determined using predictive modeling, such as by using a machine learning algorithm that receives, as input, data corresponding to a workload's power characteristics or profile, and generate, as output a power demand characterization for the workload. Additionally or alternatively, the workload's power characteristics may be adjusted during performance based on telemetry, such as measurements of power consumption during the running of the workload.

At block 330, the workload scheduler may determine which of the machines included in the system will be assigned the workload for execution. In some examples, the machines may be selected based on the power quota determination at block 320. For instance, the power quota determination may be used to identify a certain type or types of the available machines that is or are most power-efficient for executing the workload, and such machine or machines may be selected for assignment of the workload. For further instance, if some machines are better suited for relatively high-power operations and others for relatively low-power operations, or if the workload scheduler tracks predicted amounts of power consumed by each machine based on the previously assigned workload, then the machines may be selected based on the expected amount of power required for executing the workload according to the power quota determination.

At block 340, the workload scheduler may provide the power quota determination and workload assignment to the control loop for power quota control operations. Providing the power quota determination and workload assignment may involve sending information to the control loop indicating the assigned machines for the workload as well as the power—or additional power if other workloads are already running—to be allowed to the machines. At block 350, the workload scheduler may further communicate the assigned workload to the selected machines for execution. In operation, the selected machines may execute the workload in accordance with the workload scheduler's instructions, and the control loop may monitor and control an amount of power consumed by the machines handling the workload based on the power quota determination communicated from the workload scheduler.

At block 350, the workload scheduler may send the workload assignment to the one or more machines selected at block 330, and the selected machines may execute the workload. As shown in FIG. 3, execution of the workload may involve communication between the selected machines and the control loop, whereby the control loop evaluates the power demands at the selected machines as the workload is executed, and may adjust operations at the machines based on the evaluation.

At block 360, the workload scheduler may update its record based on the workload assignment. Updating the record may involve adding the power demand of the power quota determination to a recorded total power demand on the system, so that future workload requests can be managed based on a remaining available power capacity of the system. In some examples, updating the record may further involve indicating that the assigned machines are not available for assignment of a further workload, so that future workload requests are directed to different machines.

Operations may continue at block 370 when execution of the workload has been completed by the assigned machines. Since the workload is finished, the machines no longer require the provisioned power for execution. Therefore, the machines may communicate completion of the workload to the control loop and the workload scheduler, directly or indirectly.

At block 380, the control loop may update the power quota controls for the selected machines. Updating the power quota controls may involve subtracting the allocated power quota of the completed workload from the total power quota for the machines, whereby the control loop may continue to regulate the power demands of the machines to meet a lower threshold. In some examples, such as when the machines have no other workloads operating on them at completion of the workload, the lower threshold may be a predetermined minimum power level.

At block 390, the workload scheduler may update the record. Updating the record may involve subtracting the power demand of the power quota determination for the completed workload from a recorded total power demand on the system, so that future workload requests can be managed based on the remaining available power capacity of the system. In some examples, updating the record may further involve indicating that the previously assigned machines are now available for assignment of a further workload, so that future workload requests may be directed to these machines.

In the example of FIG. 3, execution of the workload is shown as being completed before any changes are made to the workload scheduler's record or the control loop's controls. However, in some circumstances, changes may be made even while execution of the workload is ongoing. For example, if the workload scheduler receives another workload to be executed in the system and according to the workload scheduler's record there is not enough remaining power available to the system in order to perform the other workload, then the workload scheduler may determine to update power quotas for one or more currently running workloads, whereby power provisioned to the currently running workloads may be reduced in order to make power available for the new workload. In some examples, the determination to make the aforementioned changes may be based on a priority level of one or more of the workloads, such as the newly received workload request having a higher priority than the previously received workload request, or the newly received workload request having a priority level that indicates that the workload must be executed immediately or within a specified time before completion of the currently running workload. The changes may be notified to the control loop for enforcement, and may be recorded in the record.

Figure 4:
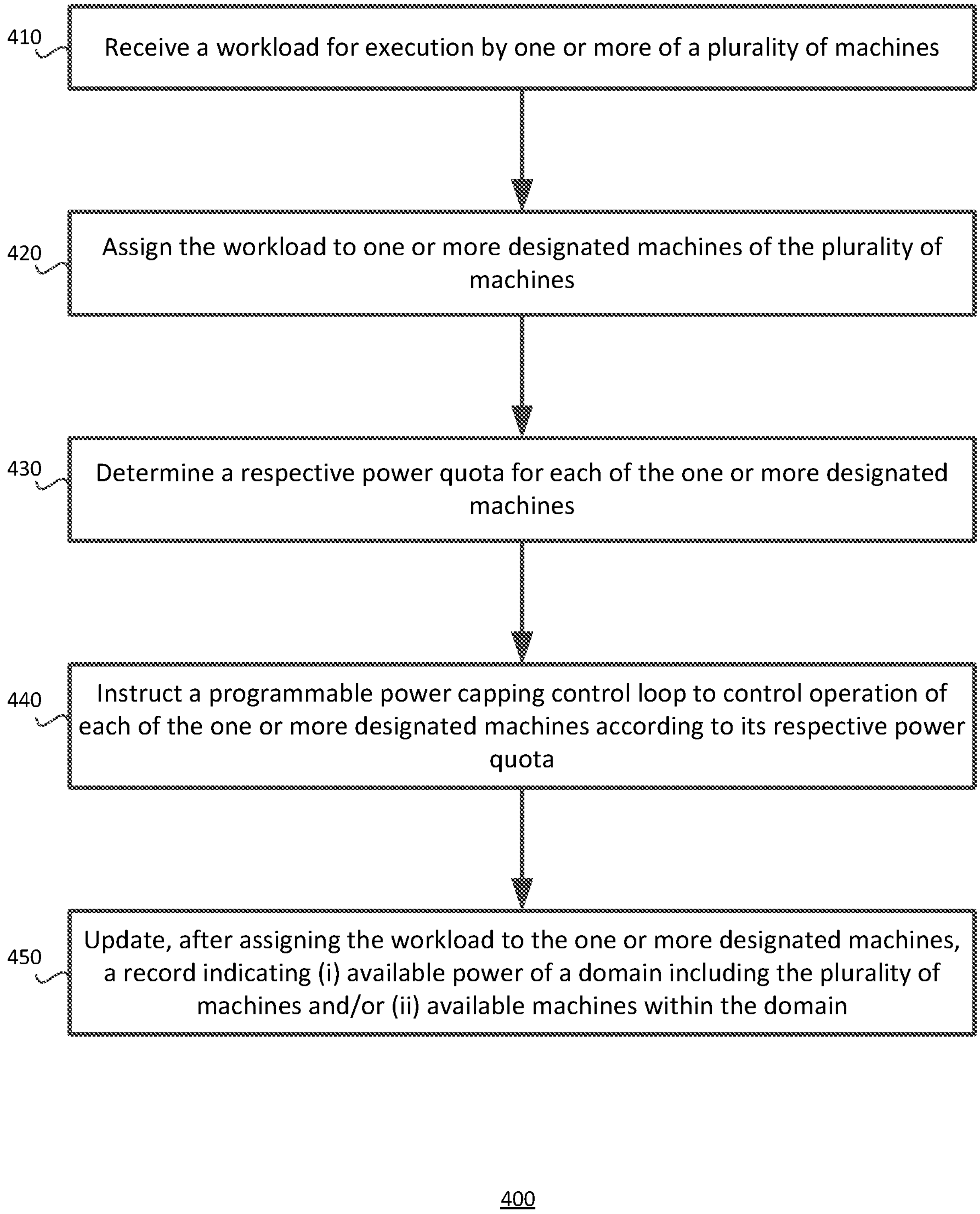
FIG. 4 is a block diagram illustrating an example process in accordance with an aspect of the present disclosure.

FIG. 4 is a flow diagram illustrating an example process 400 performed by the one or more processors of the workload scheduler.

At block 410, the one or more processors may receive a workload for execution by one or more of a plurality of machines. The workload may specify certain data to be processed, certain operations to execute on the data, or a combination thereof. The workload may be received via a network connection, such as from a client device having access to the specified data and in some instances permission to perform operations using one or more of the plurality of machines.

At block 420, the one or more processors may assign the workload to one or more designated machines of the plurality of machines. Machines may be assigned based on one or more factors, including availability and a machine type that is suitable, or in some cases most efficient, for executing the received workload. For instance, one machine may be assigned to a relatively high-power operation for which it is more suitable, while another machine may be assigned to a relatively low-power operation for which it is more suitable. Suitability may be determined, for instance, by tracking predicted amounts of power consumed by each machine based on previously assigned workloads, projecting the expected amount of power required for executing the current workload, whereby a machine's power consumption meeting the expected power requirements may indicate suitability.

At block 430, the one or more processors may determine a respective power quota for each of the one or more designated machines. The power quota may be characterized using data collected from previously executed workloads, such as the same or a similar workload that was executed in the system at a previous time and the amount of power used to execute the workload at that time. In some instances, a power characterization data source may be utilized to determine the power quota for each assigned machine. Any power characterization data source described herein may be used. For instance, the power characterization data source may include an indication of predicted power related properties of the workload, including but not limited to an average power consumption, a maximum current change slew rate, an average utilization ratio, or a maximum utilization ratio. The predicted power-related properties of the workload may then be used to determine an overall power quota for the workload. In turn, the overall power quota may be used to determine the respective power quota for each of the one or more designated machines.

At block 440, the one or more processors may instruct a programmable power capping control loop to control operation of each of the one or more designated machines according to its respective power quota. As described herein, the instruction may include information indicating the assigned machines for the workload as well as the power—or additional power if other workloads are already running—to be allowed to the machines. More generally, the information may be any information that facilitates the control loop's ability to monitor and control an amount of power consumed by the machines handling the workload based on the power quota determination. In some example implementations, the programmable power capping control loop may monitor power inputs at the one or more designated machines and adjust a thermal design power (TDP) at each of the one or more machines based on the monitored power inputs.

At block 450, the one or more processors may update, after assigning the workload to the one or more designated machines, a record indicating (i) available power of a domain including the plurality of machines and/or (ii) available machines within the domain. Updating the record may involve adding the power demand of the power quota determination to a recorded total power demand on the system, so that future workload requests can be managed based on the remaining available power capacity of the system. In some examples, updating the record may further involve indicating that the assigned machines are not available for assignment of a further workload, so that future workload requests are directed to different machines.

In operation, the process 400 may result in different changes to the system depending on whether a workload is being initiated or completed. For instance, in response to initiation of a workload, the process may result in increasing the respective power quota of each of the machines and updating the record accordingly. For further instance, in response to completion of the workload, the process may result in decreasing the respective power quota of each of the machines and updating the record accordingly. In yet another instance, if a new workload is initiated while another previously received workload is already operating, then receiving the new workload may result in adjusting the overall power quota of the previously received workload, and instructing the programmable power capping control loop to control operation of each of one or more previously designated machines to which the previous workload is assigned to adjust their respective power quotas to meet the adjusted overall power quota of the previously received workload. Adjustment of the overall power quota of the previously received workload may be based on respective priority levels of the workload and the previously received workload. Additionally, in some example routines, the one or more processors may not only adjust the overall power quota to the previously received workload, but may further transmit an indication of the adjustment of the overall power quota to the previously received workload. This can have the benefit of informing how to adjust the workload to meet the new adjusted overall power quota for the workload.

The example methods and systems described above generally refer to a workload scheduler tracking and managing the power quota of workloads performed within a single system, which may also be referred to as a power domain. However, in other examples, a single workload scheduler may be responsible for managing power quotas for workloads in multiple power domains. For example, machines in a first power domain may receive power from a first power source, and machines in a second power domain may receive power from a second power source, but the machines in both power domains may be managed by the same workload scheduler. In this regard, it may further be possible for the workloads indicated in the received workload requests to be spread between multiple power domains, such as part of the workload being executed on machines in the first power domain and another part of the workload being executed on machines in the second power domain.

The example systems and methods provide several advantages over current power capping techniques. Firstly, with the approach of the present disclosure, it is never necessary to perform large-scale power capping procedures that affect an entire power domain; instead, when a given machine reaches the enforced power limit, the control loop will adjust operations at only that machine to enforce the power limit, without affecting operations at any other machine. This avoids long-latency over-throttle events which are typical during power capping procedures of other systems.

Additionally, providing records of allocated power quota for each workload—either thorough communication between the control loop and the workload, in the workload scheduler records, or both—can be useful for determining the cause of a stoppage or slowdown in execution of the workload. For example, if a reduction in available power is noted at around the same time as a stoppage or slowdown in execution of the workload at a given machine, then power availability may be the cause of the stoppage or slowdown. Conversely, if no such reduction in power is recorded, then the stoppage or slowdown could be an indication of some other problem with the workload. Such knowledge can be especially valuable for reviewing workload performance and identifying problems with the workloads that go beyond power requirements. By contrast, in other systems in which power quotas of workloads are not tracked, the cause of a stoppage or slowdown cannot be as easily diagnosed.

Additionally, the use of dynamic power adjustment at a machine-by-machine basis can improve power optimization for the entire power domain, since reductions in power do not have to be imposed on the system as a whole. This can also lead to performance optimizations for the system as a whole since some workloads may continue to operate at full capacity even when power for other workloads is capped, and since power quota can be increased to higher levels for some machines while other machines are idle.

Additionally, by allocating power quotas to machines in a non-uniform fashion based on the respective power demands of the workloads being handled by the machines, the total cost of operation for the machines can be reduced. This can have significant cost savings as the size of the system or number of systems managed by the workload scheduler increases.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:

one or more processors; and memory having programmed thereon instructions for executing a workload scheduling program, the workload scheduling program causing the one or more processors to:

receive a workload for execution by one or more of a plurality of machines;

assign the workload to one or more designated machines of the plurality of machines;

before initiation of the workload at the one or more designated machines:

(i) predict respective amounts of power consumed by each of the one or more designated machines based on one or more power related properties of the workload;

(ii) determine a respective power quota for each of the one or more designated machines based on the predicted respective amounts of power consumed by each of the one or more designated machines; and (iii) instruct a programmable power capping control loop to adjust a control operation of each of the one or more designated machines according to its respective power quota, wherein for a given machine of the one or more designated machines, adjustment of the control operation of the given machine is based on summing the power quota of the assigned workload with power quotas of other workloads assigned to the given machine, wherein the summed power quota is an input to the power capping control loop; and update, after assigning the workload to the one or more designated machines, a record indicating (i) available power of a domain including the plurality of machines and/or (ii) available machines within the domain.

2. The system of claim 1, further comprising the programmable power capping control loop.

3. The system of claim 2, wherein the programmable power capping control loop is configured to monitor power inputs at the one or more designated machines and adjust power consumption at each of the one or more machines based on the monitored power inputs.

4. The system of claim 1, wherein the instructions further cause the one or more processors to:

in response to receiving the workload, access a power characterization data source indicating predicted power related properties of the workload;

determine an overall power quota for the workload based on the predicted power-related properties of the workload included in the power characterization data source; and determine the respective amounts of power consumed by each of the one or more designated machines based on the overall power quota.

5. The system of claim 4, wherein the power related properties include one or more of an average power consumption, a maximum current change slew rate, an average utilization ratio, or a maximum utilization ratio.

6. The system of claim 1, wherein, in response to initiation of the workload, the instructions cause the one or more processors to increase the respective power quota of each of the machines and update the record accordingly, and in response to completion of the workload, the instructions cause the one or more processors to decrease the respective power quota of each of the machines and update the record accordingly.

7. The system of claim 1, wherein the instructions further cause the one or more processors to:

in response to receiving the workload, adjust the overall power quota of a previously received workload; and instruct the programmable power capping control loop to control operation of each of one or more previously designated machines to which the previous workload is assigned to adjust their respective power quotas to meet the adjusted overall power quota of the previously received workload.

8. The system of claim 7, wherein adjustment of the overall power quota of the previously received workload is based on respective priority levels of the workload and the previously received workload.

9. The system of claim 7, wherein the instructions further cause the one or more processors to transmit an indication of the adjustment of the overall power quota to the previously received workload.

10. A data center comprising:

a programmable power capping control loop;

a plurality of machines; and a workload scheduler comprising one or more processors and memory having programmed thereon instructions for causing the one or more processors of the workload scheduler to:

receive a workload for execution by one or more of the plurality of machines;

assign the workload to one or more designated machines of the plurality of machines;

before initiation of the workload at the one or more designated machines:

(i) predict respective amounts of power consumed by each of the one or more designated machines based on one or more power related properties of the workload;

(ii) determine a respective power quota for each of the one or more designated machines based on the predicted respective amounts of power consumed by each of the one or more designated machines; and (iii) instruct the programmable power capping control loop to adjust a control operation of each of the one or more designated machines according to its respective power quota, wherein for a given machine of the one or more designated machines, adjustment of the control operation of the given machine is based on summing the power quota of the assigned workload with power quotas of other workloads assigned to the given machine, wherein the summed power quota is an input to the power capping control loop; and update, after assigning the workload to the one or more designated machines, a record indicating (i) available power of a domain including the plurality of machines and/or (ii) available machines within the domain.

11. The data center of claim 10, wherein each machine of the plurality of machines is a tray including a plurality of processor chips.

12. A method comprising:

receiving, by one or more processors of a workload scheduling program, a workload for execution by one or more of a plurality of machines;

assigning, by the one or more processors, the workload to one or more designated machines of the plurality of machines;

before initiation of the workload at the one or more designated machines:

(i) predicting, by the one or more processors, respective amounts of power consumed by each of the one or more designated machines based on one or more power related properties of the workload;

(ii) determining, by the one or more processors, a respective power quota for each of the one or more designated machines based on the predicted respective amounts of power consumed by each of the one or more designated machines; and (iii) instructing, by the one or more processors, a programmable power capping control loop to adjust a control operation of each of the one or more designated machines according to its respective power quota, wherein for a given machine of the one or more designated machines, adjustment of the control operation of the given machine is based on summing the power quota of the assigned workload with power quotas of other workloads assigned to the given machine, wherein the summed power quota is an input to the power capping control loop; and updating, by the one or more processors, after assigning the workload to the one or more designated machines, a record indicating (i) available power of a domain including the plurality of machines and/or (ii) available machines within the domain.

13. The method of claim 12, further comprising controlling, by the programmable power capping control loop, the operation of each of the one or more designated machines according to its respective power quota.

14. The method of claim 13, wherein controlling the operation of each of the one or more designated machines comprises:

monitoring power inputs at the one or more designated machines; and adjusting a thermal design power (TDP) at each of the one or more machines based on the monitored power inputs.

15. The method of claim 12, further comprising:

in response to receiving the workload, accessing a power characterization data source indicating predicted power related properties of the workload;

determining an overall power quota for the workload based on the predicted power-related properties of the workload included in the power characterization data source; and determining the respective amounts of power consumed by each of the one or more designated machines based on the overall power quota.

16. The method of claim 15 wherein the power related properties include one or more of an average power consumption, a maximum current change slew rate, an average utilization ratio, or a maximum utilization ratio.

17. The method of claim 12, further comprising:

in response to initiation of the workload, increasing, by the one or more processors, the respective power quota of each of the machines and updating the record accordingly; and in response to completion of the workload, decreasing, by the one or more processors, the respective power quota of each of the machines and updating the record accordingly.

18. The method of claim 12, further comprising:

in response to receiving the workload, adjusting the overall power quota of a previously received workload; and instructing the programmable power capping control loop to control operation of each of one or more previously designated machines to which the previous workload is assigned to adjust their respective power quotas to meet the adjusted overall power quota of the previously received workload.

19. The method of claim 18, wherein adjustment of the overall power quota of the previously received workload is based on respective priority levels of the workload and the previously received workload.

20. The method of claim 19, further comprising transmitting, by the one or more processors, an indication of the adjustment of the overall power quota to the previously received workload.

* * * * *